United States Patent [19]

Mizukusa et al.

[11] Patent Number: 4,922,949
[45] Date of Patent: May 8, 1990

[54] ROTARY VALVE MADE OF CERAMICS

[75] Inventors: Takashi Mizukusa; Juzo Yagi, both of Aichi, Japan

[73] Assignee: NGK Spark Plug Co., Ltd., Nagoya, Japan

[21] Appl. No.: 300,838

[22] Filed: Jan. 24, 1989

[30] Foreign Application Priority Data

Jan. 26, 1988 [JP] Japan ............................. 63-7695[U]

[51] Int. Cl.$^5$ .............................................. G16K 5/20
[52] U.S. Cl. ..................................... 137/309; 251/368
[58] Field of Search ............... 251/304, 309, 315, 356, 251/368

[56] References Cited

FOREIGN PATENT DOCUMENTS 29732 6/1981 European Pat. Off. .
3333137 4/1985 Fed. Rep. of Germany ...... 251/309

*Primary Examiner*—John Fox
*Attorney, Agent, or Firm*—Foley & Lardner, Schwartz, Jeffery, Schwaab, Mack, Blumenthal & Evans

[57] ABSTRACT

A rotary valve made of ceramics has edges at the junctions between a generally cylindrical outer periphery and opposite ends of a through hole. Each of the edges has a leading edge portion at which the valve starts opening and a leading edge portion at which the valve finishes closing. The leading edge portions are chamferred in such a way as to form part of surfaces of right circular cones whose vertexes are contained in an axis of rotation of the rotary valve and whose axes coincide with the center axis of the through hole.

9 Claims, 2 Drawing Sheets

ROTARY VALVE MADE OF CERAMICS

BACKGROUND OF THE INVENTION

1. Field of the Invention

The present invention relates in general to pipe valves and more particularly to a ceramic rotary valve for use in a piping system which is required to have a good heat and corrosion resistance or a ceramic rotary valve used for accurately controlling the flow of fluid in a piping system.

2. Description of the Prior Art

An example of a prior art rotary valve for regulating the flow of fluid in a piping system is shown in FIG. 3. Referring to the figure, a rotary valve (A) is opened, i.e., its through hole (B) is aligned with a fluid passage (D) of a pipe (C) when the rotary valve (A) assumes the illustrated position through rotation about its center axis in the direction indicated by the arrow, thus allowing fluid to flow through the rotary valve (A). The rotary valve (A) is closed when further rotated in the same direction in case of a one way rotational type or rotated in the opposite direction in case of a two way rotational type. The rotary valve (A) is made of ceramics when fluid has a high temperature or fluid is highly corrosive.

In an automatic control or remote control of the flow of fluid in a piping system, it is necessary to accurately control opening and closing of the rotary valve (A). Particularly, in case where fluid to be controlled is gas, it is necessary to accurately control the rotary valve (A) with respect to the position where it starts opening and the position where it finishes closing.

However, when the rotatary valve (A) is made of ceramics, its baked outer periphery is poor in dimensional accuracy due to contraction at baking or firing. Further, since compacts differ in coefficient of contraction from each other, the angle of rotation of the rotary valve (A) between the position where it starts opening and the position where it finishes closing varies from product to product due to variations of coefficient of contraction. For this reason, it has been necessary to apply a complicated and delicate machining to the rotary valve (A) to attain the accurate dimensions.

In order to solve this problem, it has been proposed to form the through hole smaller than a finishing diameter at baking and then grind it to the required diameter. However, this requires a costly machining.

SUMMARY OF THE INVENTION

In accordance with the present invention, there is provided an improved rotary valve made of ceramics.

The rotary valve is rotatable about an axis and has a generally cylindrical outer periphery coaxial with the axis of rotation, a through hole extending across the axis of rotation and a pair of edges at the junctions between the outer periphery and opposite ends of the through hole. Each of the edges has a leading edge portion at opening and a leading edge portion at closing. Each of the leading edge portions are chamferred so as to form part of a surface of a cone whose vertex is contained in the axis of rotation.

The above construction is effective for solving the above noted problems inherent in the prior art rotary valve made of ceramics.

It is accordingly an object of the present invention to provide an improved rotary valve made of ceramics which can reduce the manufacturing cost without deteriorating the dimensional accuracy.

It is another object of the present invention to provide an improved rotary valve of the above described character which does not require a particular finish grinding after baking in order to attain the dimensional accuracy.

It is a further object of the present invention to provide an improved rotary valve of the above described character which can prevent or at least reduce the possibility of chipping or breakage at the opposite ends of its through hole during handling or usage.

DESCRIPTION OF THE PREFERRED EMBODIMENT

Figure 1:
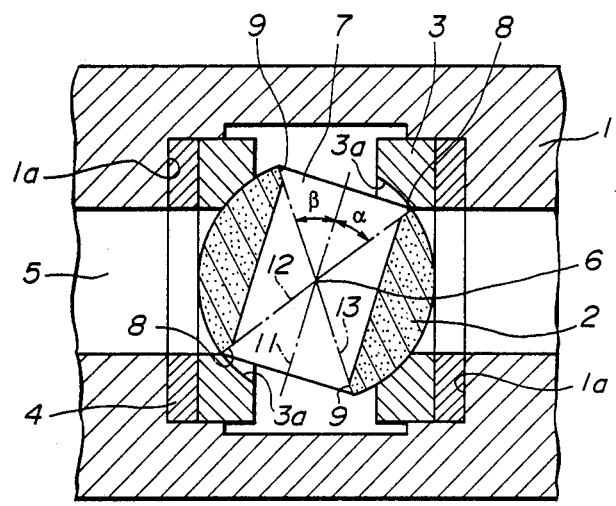
FIG. 1 is a horizontal sectional view of a piping system incorporating a ceramic rotary valve according to an embodiment of the present invention.
Figure 2:
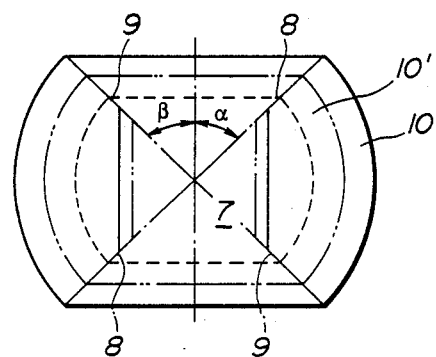
FIG. 2 is a plan view of the rotary valve in the embodiment of FIG. 1.
Figure 3:
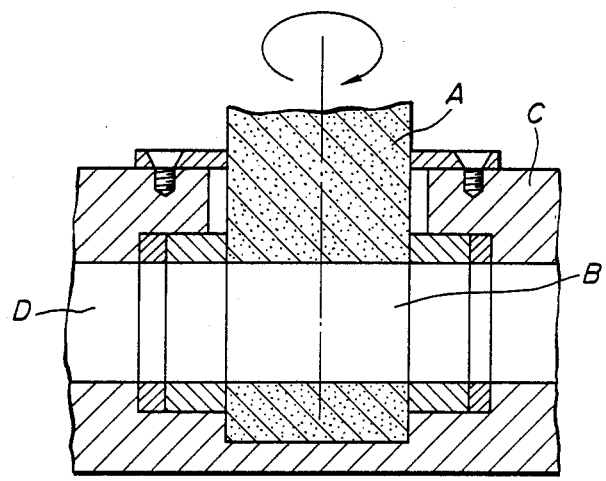
FIG. 3 is a vertical sectional view of a piping system incorporating a prior art ceramic rotary valve.

Referring to FIGS. 1 and 2, a piping system is shown as comprising a pipe 1 having a fluid passage 5, a pair of seal rings 3 and 3 installed in the pipe 1 in such a way as to be spaced from each other in the axial direction of the pipe 1, a ceramic rotary valve installed in the seal rings 3 and 3 in such a way as to be rotatable about an axis 6 which extends across the axis of the pipe 1 at right angles and a pair of pressers 4 and 4 interposed between the seal rings 3 and 3 and corresponding shoulders 1a and 1a formed in the pipe 1.

More specifically, the rotary valve 2 is in the form of a generally cylindrical bar and formed with a through hole 7 of a circular cross section and of which center axis 11 extends across the axis 6 of rotation of the rotary valve 2 at right angles. In this manner, the rotary valve 2 is rotatably received in part-cylindrical depressions 3a and 3a formed in the seal rings 3 and 3.

A compact for the ceramic rotary valve 2 is produced by injection molding. The compact has a pair of edges at the junctions between the generally cylindrical outer periphery and the through hole 7. Each of the edges has a leading edge portion 8 at which the rotary valve 2 starts opening and a leading edge portion 9 at which the rotary valve 2 finishes closing. The leading edge portions 8 and 9 are chamferred so as to form part of surfaces of two right circular cones whose axes coincide with the center axis 11 of the through hole 7 and whose vertexes are contained in the axis 6 of rotation of the rotary valve 2. More specifically, the chamferred edge portions 8 and 9 are so formed as to have oblique faces of which widths are at least 0.2 mm after the compact is baked and then subjected at the outer periphery to finish grinding. The rotary valve 2 is of the one way rotational type, i.e., of the type which is rotated in one direction only.

Due to variations of coefficient of contraction at baking, the baked products differ in dimensions from each other. For example, two baked products 10 and 10' may differ in dimensions as shown in an exaggerated manner in FIG. 2 in which one product 10 is shown by solid line and the other is shown by two-dot chain line. In this instance, $\alpha$ is an angle between the center line 11 and one diameteral line 12 which are contained in a common cross sectional plane and $\beta$ is an angle between the center line 11 and another diameteral line 13 which are contained in the above described cross sectional plane. Since a compact contracts similarly in shape into a baked product, the angles α and β are maintained unchanged between the baked products 10 and 10', i.e., the chamferred edges 8 and 9 form part of the surfaces of the above described cones even after baking. Due to this, by grinding the outer peripheries of the baked products 10 and 10' to the required dimensions as indicated in an exagerated manner by dotted line in FIG. 2, it becomes possible for the two rotary valves 10 and 10' to rotate, through the same angle, between the position where it starts opening and the position where it finishes closing even when the through holes 7 and 7 of the two differ in bore diameter from each other.

After finish grinding, the rotary valve 2 is processed by barrel finish for thereby forming the sharp edged portions at the opposite ends of the through hole 7 into rounded edge portions of 0.1–0.3 R. This is effective for further preventing chipping or breakage of the rotary valve 2 at the opposite ends thereof in addition to the effect of the above described chamferring.

From the foregoing, it will be understood that the chamferred edge portions 8 and 9 move on the surfaces of the above described cones during contraction of the product since the compact contracts similarly in shape. In this connection, the widths of the chamferred edge portions 8 and 9 before baking are formed so as to be larger than 1% of the valve radius (radius of the cylindrical valve 2) in order to cope with variations of the outer peripheral dimensions of the rotary valve 2. In this connection, 2–3% is practically desirable.

It will be further understood that according to the present invention an accurate control of opening and closing of the rotary valve 2 can be attained by only applying a finish grinding to the outer periphery of the rotary valve 2 and at the same time it becomes possible to prevent or at least reduce the possibility of chipping or breakage of the rotary valve 2 at the opposite ends of the through hole 7.

It will be further understood that in order to attain the accuracy of the positions at which the rotary valve 2 starts opening and finishes closing, the chamferred edge portions 8 and 9 are needed to exist even after finish grinding of the outer periphery of the rotary valve 2. In this connection, it is desirable for the chamferred edge portions 8 and 9 to have oblique faces of at least 0.2 mm or more in width in order to prevent the ceramic rotary valve 2 from chipping or breakage.

It will be further understood that the edges at the junctions between the outer periphery and the opposite ends of the through hole 7 may be chamferred entirely in the above manner, i.e., may be chamferred in such a way as to form part of the surfaces of the above described cones whose axes coincide with the center axis 11 of the through hole 7 and whose vertexes are contained in the axis 6 of rotation of the rotary valve 2. When this is the case, the entirely chamferred edges 8 and 9 do not form an acute angle with the part-cylindical outer periphery of the rotary valve 2, thus being more effective for preventing chipping of the rotary valve 2 at the opposite ends of the through hole 7 during handling or usage.

While the rotary valve 2 has been described and shown as being of the kind having a generally cylindrical outer periphery, this is not limitative. For example, the rotary valve 2 may be spherical, i.e., may have a spherical outer periphery. Therefore, the present invention can be applied to a rotary valve having an outer periphery of a generally circular cross section which is concentric with its axis of rotation.

What is claimed is:

1. A rotary valve made of ceramics and rotatable about an axis, comprising:
    an outer periphery of a generally circular cross section concentric with said axis of rotation;
    a through hole extending across said axis of rotation; and
    a pair of edges at the junctions between said outer periphery and opposite ends of said through hole;
    each of said edges having a leading edge portion at opening and a leading edge portion at closing;
    each of said leading edge portions being chamferred so as to form part of a surface of a cone whose vertex is contained in said axis of rotation.

2. The rotary valve according to claim 1 wherein each of said leading edge portions has an oblique face of which width is at least 0.2 mm after finish grinding of said outer periphery.

3. A rotary valve made of ceramics and rotatable about an axis, comprising:
    an outer periphery of a generally circular cross section concentric with said axis of rotation;
    a through hole having a center axis extending across said axis of rotation at right angles; and
    a pair of edges at the junctions between said outer periphery and opposite ends of said through hole;
    said edges being chamferred so as to form part of surfaces of two right circular cones whose vertexes are contained in said axis of rotation and whose axes coincide with said center axis of said through hole.

4. The rotary valve according to claim 3 wherein each of said edges has a leading edge portion at valve opening and a leading edge portion at valve closing, said edges being chamferred only at said leading edge portions.

5. The rotary valve according to claim 3 wherein said edges are entirely chamferred.

6. The rotary valve according to claim 3 wherein said edges have oblique faces of which widths are at least 0.2 mm after finish grinding of said outer periphery.

7. A piping system comprising:
    a pipe having a fluid passage; and
    a rotary valve made of ceramics and rotatable about an axis transversal to an axis of said pipe;
    said rotary valve having an outer periphery of a generally circular cross section concentric with said axis of rotation, a through hole capable of being aligned with said fluid passage through rotation of said valve about said axis, and a pair of edges at the junctions between said outer periphery and opposite ends of said through hole, said edges having a leading edge portion at which said valve starts opening and a leading edge portion at which said valve finishes closing;
    said leading edge portions being chamferred in such a way as to form part of surfaces of two right circular cones of which vertexes are contained in said axis of rotation.

8. The piping system according to claim 7 wherein said through hole has a center axis extending across said axis of rotation at right angles, said two right circular cones have axes which coincide with said center axis of said through hole.

9. The piping system according to claim 7 wherein said edges have oblique faces of which widths are at least 0.2 mm after finish griding of said outer periphery of said rotary valve.

* * * * *